United States Patent [19]
Matsushita et al.

[11] Patent Number: 5,958,988
[45] Date of Patent: *Sep. 28, 1999

[54] CROSS-LINKED POLYURETHANE RESIN POWDER AND PROCESS FOR PRODUCING THE SAME

[75] Inventors: Mitsumasa Matsushita; Takumi Taniguchi; Takashi Ohta; Norio Sato; Yuji Hoshino, all of Nagoya; Kanemitsu Kondo, Anjo; Naruaki Abe; Toshiyuki Suzuki, both of Toyota, all of Japan

[73] Assignee: Toyota Jidosha Kabushiki Kaisha, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/744,483

[22] Filed: Nov. 6, 1996

[30] Foreign Application Priority Data

Nov. 9, 1995 [JP] Japan .................................. 7-291203

[51] Int. Cl.$^6$ .................................................. C08J 11/14
[52] U.S. Cl. ............................ 521/49; 521/49.5; 528/85; 528/481; 528/499; 525/459
[58] Field of Search ....................... 521/49, 49.5; 528/85, 528/481, 499; 525/459

[56] References Cited

U.S. PATENT DOCUMENTS

| | | | |
|---|---|---|---|
| 3,954,681 | 5/1976 | Castle | 521/49 |
| 4,156,768 | 5/1979 | Cook | 521/49.5 |
| 5,342,884 | 8/1994 | Tabor | 525/125 |
| 5,539,004 | 7/1996 | Ikeda | 521/49 |

FOREIGN PATENT DOCUMENTS 57-023638  2/1982  Japan ...................................... 521/49

*Primary Examiner*—Patricia A. Short
*Attorney, Agent, or Firm*—Finnegan, Henderson, Farabow, Garrett & Dunner, L.L.P.

[57] ABSTRACT

A cross-linked polyurethane resin powder includes a powder including particles made from a hard or a semi-hard polyurethane resin. The particles have a superficial portion and an internal portion disposed inside the superficial portion, and involve cross-linked bondings therein. Part of the cross-linked bondings are unchanged, and another part thereof are broken to result in activated groups. At least part of the activated groups are exposed on the superficial portion of the particles. The cross-linked polyurethane resin powder is produced by hydrolyzing a hard or semi-hard polyurethane resin in the presence of water and in a temperature range of from a hydrolysis temperature of the resin to a liquefying temperature thereof, and by applying a predetermined shearing force to the resin. The cross-linked polyurethane resin powder can disperse well in resinous substrates, and can upgrade the physical properties of the resulting recycled products.

19 Claims, 2 Drawing Sheets

CROSS-LINKED POLYURETHANE RESIN POWDER AND PROCESS FOR PRODUCING THE SAME

BACKGROUND OF THE INVENTION

1. Field of the Invention

The present invention relates to a cross-linked polyurethane resin powder, or a recycled product resulting from a hard or semi-hard polyurethane resin, and a process for producing the same.

2. Description of the Related Art

As the global environment has been deteriorating, it has been required recently to construct an environment-friendly society. In order to reduce detrimental loads to the environment and to utilize the resources effectively, resin scraps have been investigated for the re-usage.

In the automobile industry, a variety of investigations have been conducted to recycle resin scraps. In particular, resin bumpers are a large-sized component part, and have been investigated extensively to recycle the constituent materials.

Whereas, polypropylene resins and polyurethane resins are used to make resin bumpers. The former resins are thermoplastic resin which can be re-melted, and can be readily recycled by re-molding resin bumper scraps. On the contrary, the later resins are thermosetting resin which forms insoluble and infusible molecular skeletons by cross-linking reactions, and accordingly cannot be recycled without subjecting them to certain preliminary treatments.

The following processes are available to recycle polyurethane resin bumpers: namely;

chemical recycling in which the resin components are decomposed and turned back into original raw materials by chemical treatments, such as glycolysis, aminolysis and hydrolysis;

thermal recycling in which the resin components are burned and collected as a thermal energy; and material recycling in which the resin components are cut, broken or pulverized, the resulting minute pieces are used as packings, fillers, leveling materials, noise-absorbers or anti-vibrators. Alternatively, the resultant minute pieces are compression-molded by a predetermined pressure to substitute for rubber component parts.

Especially, in the material recycling, when a recycled component part is prepared by adding scrapped polyurethane bumpers to a virgin resin, it is important to increase the miscibility of the scrapped polyurethane bumpers and the virgin resin in order to inhibit the problems, for example, deteriorated physical properties and degraded superficial appearance, which result from the improperly dispersed scrapped polyurethane bumpers. Hence, it is needed to finely pulverize the scrapped polyurethane bumpers to increase the miscibility of the scrapped polyurethane bumpers and the virgin resin.

It is possible to think of pulverizing a hardened polyurethane resin with a hammer mill, or the like, to prepare a powder. However, this pulverizing process is associated with the problem in that the resultant powder melts together and solidifies by the heat generated from the resin. If the resin is frozen and pulverized in order to suppress the heat generation, such a process pushes up the recycling cost.

Japanese Unexamined Patent Publication (KOKAI) No. 50-154,379 discloses a process for preparing a polyurethane resin powder. In the process, a scrap polyurethane foam is hardened by using a curing resin, and is thereafter pulverized to a powder. Similarly, Japanese Unexamined Patent Publication (KOKAI) No. 51-87,583 sets forth a process for producing fine particles in which a polyurethane foam is swelled by a solvent and is pulverized to fine particles by using a mechanical shearing force only.

Moreover, Japanese Unexamined Patent Publication (KOKAI) No. 6-91,650 discloses a process for finely pulverizing a soft polyurethane foam by using a shearing force of an extruder only. In addition, Japanese Examined Patent Publication (KOKOKU) No. 58-20,969 discloses a process for recycling a polyurethane foam in which water is added to a polyurethane foam, and in which heat and a shearing force are applied to the resulting mixture to thermally plasticize the polyurethane foam. In this technique, the polyurethane foam comprises a linear polymer, and a bi-functional component, such as isocyanate. Therefore, the resultant cross-linked and thermally-plasticized polyurethane foam is a recycled product of low cross-linking density, because, in the thermal plasticization, the main reaction is a chain-developing reaction, and the side reaction is a cross-linking and networking reaction.

On the other hand, in the preparation of a semi-hard or hard polyurethane resin, the chain-developing reaction, and the cross-linking and networking reaction are competitive reactions to each other, because the preparation employs a primary amine as a cross-linking agent. Accordingly, the semi-hard or hard polyurethane resin is a raw material of high cross-linking density, and, in addition to the urethane bondings, it has many urea bondings working as cross-linking points.

In short, the polyurethane resin foam, and the semi-hard or hard polyurethane resin fundamentally differ in the resinous composition. Therefore, even if the polyurethane-foam recycling processes are applied to the semi-hard or hard polyurethane resin, no similar recycled products can be obtained.

As having discussed so far, in order to re-use bumper scraps made from a semi-hard or hard polyurethane resin in a large quantity, for example, by means of material recycling, it is an engineering requirement to establish a technique which can economically prepare a resin powder of stable quality.

SUMMARY OF THE INVENTION

It is therefore an object of the present to effectively use semi-hard and hard polyurethane scraps. It is a further object of the present invention to provide a technique which can economically produce a polyurethane resin powder or a polyurethane-resin-powder aggregate of stable quality in a short period of time. The resulting powder is provided with a large number of activated groups on the superficial portion so that it can be employed in material recycling.

A cross-linked polyurethane resin powder according to the present invention comprises:

a powder including particles made from at least one resin selected from the group consisting of a hard polyurethane resin and a semi-hard polyurethane resin;

the particles having a superficial portion and an internal portion disposed inside the superficial portion, and involving cross-linked bondings therein;

part of the cross-linked bondings being unchanged, and another part thereof being broken to result in activated groups; and at least part of the activated groups exposed on the superficial portion of the particles.

Depending on the degree of the breakage in the cross-linked bondings, the present cross-linked polyurethane resin powder can be formed as from a simple powdered form to an aggregate of simple powder. The aggregate form is furthermore preferred, because it can be crushed to a powdered form with ease, and because the cross-linked bondings are broken to a high degree. Thus, the aggregate form has the activated groups on the superficial portion with a higher density than that of the simple powdered form.

Moreover, it is preferred that the hard or semi-hard polyurethane resin can comprise a hydroxy compound, an isocyanate compound and a cross-linking agent, and that the hard or semi-hard polyurethane resin can be prepared by reaction injection molding.

A process for producing a cross-linked polyurethane resin powder according to the present invention comprises the steps of:

hydrolyzing at least one resin selected from the group consisting of a hard polyurethane resin and a semi-hard polyurethane resin in the presence of water and in a temperature range of from a hydrolysis temperature of the resin to a liquefying temperature thereof; and shearing the resin by applying a predetermined shearing force to the resin, thereby pulverizing the resin.

In the present production process, the resin is a hard polyurethane resin or a semi-hard polyurethane resin which is prepared by using a cross-linking agent like a primary amine. In other words, the hard polyurethane resin or the semi-hard polyurethane resin has cross-linked urethane bondings and cross-linked urea bondings with a high density. As a result, the hard polyurethane resin or the semi-hard polyurethane resin can be readily transformed into a resin powder by hydrolyzing and shearing, and can produce activated groups which mainly result from part of broken urethane bondings. Note that, however, it is not always necessary, simultaneously with the application of the shearing force, to add water to the hard polyurethane resin or the semi-hard polyurethane resin, and to apply heat thereto.

In the present cross-linked polyurethane resin powder, part of the cross-linked bondings of the cross-linked polyurethane resin is broken, and the activated groups, resulting from the broken cross-linked bondings, are exposed on the superficial portion of the powder. Moreover, the activated groups are generated when the hard polyurethane resin or the semi-hard polyurethane resin is subjected to the hydrolysis and shearing, and are exposed on the superficial portion of the powder partially at least.

The features of the present cross-linked polyurethane resin powder can be verified by the improved wettability with respect to water, compared with that of an ordinary polyurethane resin. They can also be proved by the enlarging permittivity $\epsilon$, and by the anti-charging ability accompanied therewith.

When the present cross-linked polyurethane resin powder is mixed with another resinous material, the activated groups react with a matrix of the resinous material, or enhance the compatibility with respect to a matrix of the resinous material, because the activated groups are exposed partially on the superficial portion of the present cross-linked polyurethane resin powder. As a result, it is possible to produce a recycled product which does not suffer from the improper dispersion and the deteriorated resinous characteristics. Thus, in terms of properties, the present cross-linked polyurethane resin powder differs greatly from the conventional polyurethane resin powders which are simply pulverized mechanically.

The present production process can be applied to the hard polyurethane resin or the semi-hard polyurethane resin which comprises a hydroxy compound (or a compound containing a hydroxy group), an isocyanate compound (or a compound containing an isocyanate group) and a cross-linking agent, and which is prepared by reaction injection molding. Note that the hard polyurethane resin or the semi-hard polyurethane are not limited to scraps which originate from manufacturing processes, or which are collected from market places, but they can be a virgin material, or even mixtures of a virgin material and scraps.

The activated groups of the present cross-linked polyurethane resin powder are functional groups which are formed by breaking the urethane bondings and urea bondings, and can be exemplified by an amino group, a hydroxy group, and the like.

The resulting amino group is expected to react with a carboxylic group, an isocyanate group, an epoxy group, etc. The resultant hydroxy group is expected to react with a methoxy group, an isocyanate group, etc. Accordingly, when the present cross-linked polyurethane resin powder is blended with a thermoplastic resin, such as a vinyl acetate resin, and a nylon resin, or when it is blended with a thermosetting resin, such as an epoxy resin, it is expected to react with the thermoplastic or thermosetting resin. Thus, novel resinous characteristics can be expected to arise.

Likewise, when the present cross-linked polyurethane resin powder is compounded with a resin into which a reactive group, such as a maleic anhydride group, and an epoxy group, is introduced, or when it is compounded with a resin which has a functional group capable of reacting with the amino group or hydroxy group, it is expected to react with such a resin. Thus, another novel resinous characteristics can be expected to arise.

Moreover, when a polar group is present in a resinous member to be blended, it may not react with the activated groups of the present cross-linked polyurethane resin powder. However, the present cross-linked polyurethane resin powder is expected to exhibit compatibility with respect to such a resinous member by the action of the activated groups.

In addition, the present cross-linked polyurethane powder exhibits enhanced wettability with respect to water, because the activated groups, being a polar group as well, exist on the superficial portion. As a result, it can be readily mixed with a hydrous material.

In particular, when the present cross-linked polyurethane resin powder is compounded with a resinous member, it enlarges the permittivity $\epsilon$ of the resultant resinous blend, and at the same time gives anti-charging ability thereto.

Contrary to the present cross-linked polyurethane resin powder, the conventional polyurethane resin particles are prepared by simply pulverizing conventional polyurethane resins mechanically. In the conventional polyurethane resin particles, the activated groups are present less. Consequently, the conventional polyurethane resin particles can hardly be expected to produce the advantageous effects of the present invention.

An average particle diameter of the present cross-linked polyurethane resin powder can be determined according to the specific applications, because its size depends on the requirements in the specific service purposes. For instance, when the present cross-lined polyurethane resin powder is blended with a resinous member, the average particle diameter can be 1 mm or less, preferably 200 $\mu$m or less. When the average particle diameter is more than 1 mm, the resultant resinous blend causes defective appearances on molded products, or causes improper dispersion which deteriorates the mechanical strengths of molded products. Thus, such a large average particle diameter is not preferable.

Note that, however, the present cross-linked polyurethane resin powder can be pulverized finely and dispersed minutely by a shearing force exerted thereto in a kneading or compounding step during the blending process. Accordingly, the present cross-linked polyurethane resin powder can be dispersed as finer particles, which have a smaller average particle diameter than the original average particle diameter of the present cross-linked polyurethane resin powder, in molded products.

The phrase, "powder with an aggregate-like appearance", means the present cross-linked polyurethane resin powder which is subjected to shearing. Thus, the independent particles are agglomerated to have a clay-like form. Consequently, the sheared present cross-linked polyurethane resin powder has the activated groups on the superficial portion in a greater quantity, and thereby exhibits higher reactivity As a result, the sheared present cross-linked polyurethane resin powder can modify resinous members to be mixed therewith highly effectively.

When the present cross-linked polyurethane resin powder is produced from a polyurethane resin which is prepared by reaction-injection molding, it is formed as a dry powder as a whole. Accordingly, it can be used effectively as a resinous filler, or a thixotropy-giving agent for paints.

Concerning to what extent the cross-linked bondings are broken in the hard or semi-hard polyurethane resin to prepare the present cross-linked polyurethane resin powder, the urethane bondings therein can be broken by 20% or more, further preferably for the most part. When the urethane bondings are broken insufficiently, the resulting cross-linked polyurethane resin powder cannot be pulverized finely by applying a shearing force. Moreover, the urethane bondings therein can preferably be broken by 100% or less, or can further preferably be broken in a range of from 50 to 75%.

On the other hand, the urea bondings in the hard or semi-hard polyurethane resin can be unbroken by half or more. When the urea bondings are broken to a greater extent, the resulting product liquefies. Thus, no desirable recycled product can be prepared. Moreover, the urea bondings therein can preferably be unbroken in a range of from 20 to 100%, furthermore preferably from 50 to 75%.

The degrees of the urethane-bonding breakage and urea-bonding breakage can be verified by infrared spectroscopy: namely; the absorption variations thereof are observed. For example, in polyurethane resins for making automobile bumpers, the urethane bondings at 1,730 $cm^{-1}$ start to decrease when heated at about 200° C., and are broken mostly when heated at about 280° C. Whilst, most of the urea bondings are unbroken when heated at about 310° C.

Note that the present cross-linked polyurethane resin powder can be subjected to post-treatments depending on the specific service purposes. For example, it can be cured by using isocyanate, or can be cured by using a thermosetting resin, an inorganic curing substance, or starch. Moreover, it can be subjected to a surface treatment employing a silane coupling agent, or a titanium-based coupling agent.

As described earlier, the present process for producing a cross-linked polyurethane resin powder comprises the hydrolyzing step, and the shearing step. It is preferred that the hard or semi-hard polyurethane resin is pulverized preliminarily to a chip shape or a pellet shape. This preliminary pulverizing step can be carried out simultaneously with the hydrolyzing step, or after the hydrolyzing step. It is practical, however, that the preliminary pulverizing step is carried out before the hydrolyzing step.

It is important that, in the hydrolyzing step of the present production process, the hard or semi-hard polyurethane resin is adequately humidified. Especially, when the hydrolyzing step and the shearing step are carried out simultaneously, an upper limit of the humidified water content of the hard or semi-hard polyurethane can be 10% by weight or less, preferably 6% by weight or less. A lower limit of the humidified water content can be about naturally-humidified water content. The term, "naturally-humidified water content", means a water content exhibited by the hard or semi-hard polyurethane resin which is not subjected to drying before it is processed by the present production process. Moreover, the lower limit of the humidified water content can be 0.1% by weight or more, preferably 0.4% by weight or more. In addition, the hard or semi-hard polyurethane resin free from humidifying can be used when the present production process is carried out in the presence of water, or when water is added to the hard or semi-hard polyurethane resin in the course of the present production process. Note that water can be added in such an amount that no pressure-resistance requirement is applied to a processing container which can be used in the processing temperature range of the present production process.

Concerning the standard on the water content control for the resulting present cross-linked polyurethane resin powder, the water content can be about 0.1% by weight or more, preferably 0.4% by weight or more. Moreover, the water content can be 10% by weight or less, preferably 6% by weight or less.

The processing temperature of the present production process can be held in a range of from a hydrolysis temperature (e.g., about 180° C.) of the hard or semi-hard polyurethane resin to a liquefying temperature thereof For instance, when a polyurethane resin bumper is processed by the present production process, it can preferably be processed in a temperature range of from 200 to 310° C. When it is processed at a temperature of less than 200° C., such processing is not practical because it takes longer to complete. On the other hand, when it is processed at a temperature of more than 310° C., the resulting product liquefies or turns into gas, and no desired product can be produced. In addition, such processing at elevated temperatures is not preferable, because there is a fear for generating harmful substances, for example, a cyanide gas, etc.

The present production process can employ any heating means without specific limitations. Heating means, however, can preferably apply heat to the hard or semi-hard polyurethane resin uniformly in a short period of time. For instance, when a large-sized component part, like bumpers, is processed, a heating bath can be employed. The heating bath is capable of accommodating a large-sized component part therein, and heats it with a heat source, such as an infrared ray, a microwave, and a hot wind. It is important that, even in the presence of water, the heating bath can heat the hard or semi-hard polyurethane resin uniformly in a short period of time. Moreover, when processing polyurethane resin bumpers, it is effective to process them by using a microwave as a heat source.

The time required for hydrolyzing the hard or semi-hard polyurethane resin can be determined according to particular circumstances, because it depends on the specific compositions of the hard or semi-hard polyurethane resin, the specific processing temperatures, and the specific structures of the processing apparatuses.

Further, a compound having an activated hydrogen, or an organometallic compound can be added to a reaction mixture in order to facilitate the hydrolysis reaction. In addition to these compounds, other additives can be added thereto as far as they do not hinder the present production process.

In the present production process, the cross-linking points of the hard or semi-hard polyurethane resin are broken by using heat and water. Hence, water is kept from volatilizing in order to prepare a desired recycled product.

In the shearing step, the hydrolyzed hard or semi-hard polyurethane resin is pulverized by applying a shearing force. For example, a shearing apparatus can be a pair of flat rolls, an extruder, a kneader, etc., which can pulverize the resin by means of a shearing force. Further, a shearing apparatus can be a hammer mill, a jet mill, etc., which can pulverize the resin by means of an impact force. Furthermore, a shearing apparatus can be a vibration mill, a pair of convexed rollers, a mortar, etc., which can pulverize the resin by means of a crushing force. These specific apparatuses can be employed independently, or two or more of them can be combined to use. It is preferred to employ an extruder or an enclosed kneader as a pulverizer, because such an apparatus can simultaneously hydrolyze and pulverize the resin by means of a shearing force to efficiently carry out the present production process. In particular, an extruder can be a most preferred processing apparatus, because it can not only inhibit water from volatilizing but also process the resin continuously. Note that, when processing a large-sized component part like a bumper, it is preferred to roughly pulverize the large-sized component part in advance.

Depending on how the cross-linking points of the hard or semi-hard polyurethane resin are broken, the present production process can produce products from a powder to an aggregate of powder. The particle diameters of the resulting powder, and the particle-diameter distribution thereof can be determined as required by specific applications, because they are dependent on how the hard or semi-hard resin is pulverized during the present production process.

As having described so far, the present cross-linked polyurethane resin powder is prepared by pulverizing the hard or semi-hard polyurethane resin. In the preparation, the urethane bondings of the hard or semi-hard resin is broken by half or more by hydrolysis and a shearing force. However, part of the urethane bondings, and most of the urea bondings are unbroken because the hydrolysis is carried out at a temperature of the liquefying temperature or less.

The thus prepared present cross-linked polyurethane resin powder has activated groups (e.g., amino groups, hydroxy groups, and the like), softens, and takes a form of powder. It can not only mix with mating resinous materials, but also bond chemically thereto via the activated groups. Accordingly, it gives the resultant mixture product physical properties which have not been available from conventional mixture products. Further, it can be dispersed finely and uniformly in mating resinous materials, or is likely to be mutually soluble therewith. Furthermore, when it is used as a filler, it will not constitute a starting point to fracture mating resinous materials, because the cross-linkings are broken partially to soften the cross-linking structure.

The powder prepared by the present production process is of low charging ability, because the activated groups, being polar groups as well, are exposed on the superficial portion of the powder. Contrary to the conventional powders pulverized simply mechanically, it can be treated with ease, and is expected to exhibit improved dispersibility. For instance, it does not deposit on containers electrostatically. Moreover, it can be used, for example, as a component of water base soluble paints, because it shows exhibits affinity with respect to water to a certain degree.

One of the major applications of the present cross-linked polyurethane resin powder is an admixture to thermoplastic resin, thermoplastic resin, rubber, asphalt, and concrete, thereby saving the weight of the resulting mixture products and enhancing the shock-absorbing and heat-insulating abilities thereof.

In the present production process, when the processing temperature is set at elevated temperatures, or when the shearing force is strengthened, the density of the activated groups is enlarged so that the resulting powder can be turned into an aggregate. However, the aggregate will not cause any problem in re-applications, because it can disintegrate immediately.

Moreover, in the present production process, the urethane bondings of the hard or semi-hard polyurethane resin are broken chemically by the hydrolysis treatment, thereby generating the activated groups and decreasing the resinous strength. Depending on how the urethane bondings are broken, the hydrolyzed hard or semi-hard polyurethane resin is pulverized, or is further processed to an aggregate of powder.

Thus, in accordance with the present invention, bumper scraps made from the hard or semi-hard polyurethane resin, for example, can be re-used for material recycling.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Figure 1:
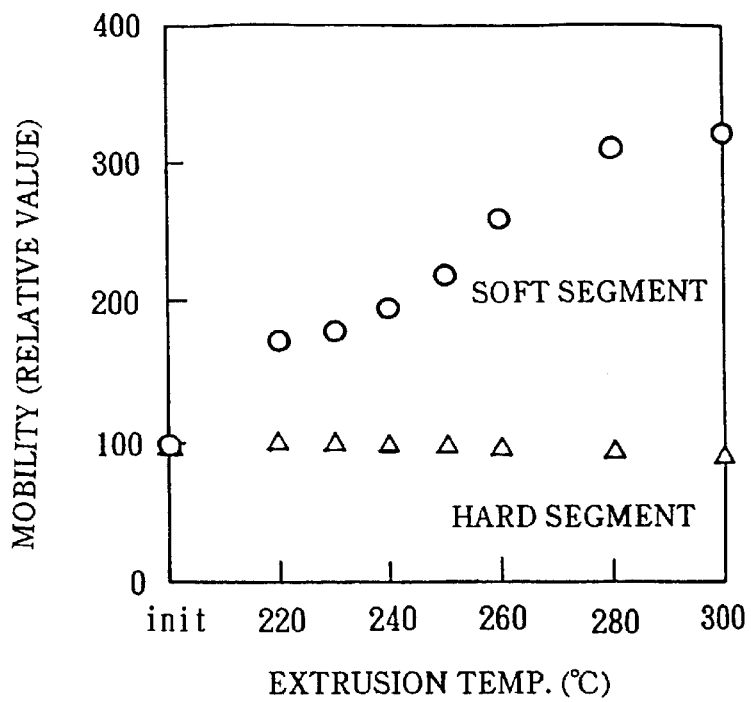
FIG. 1 is a graph for illustrating relationships between extrusion temperatures and mobilities of hard segments and soft segments of a polyurethane resin.

Having generally described the present invention, a further understanding can be obtained by reference to the specific preferred embodiments which are provided herein for the purpose of illustration only and not intended to limit the scope of the appended claims.

The present invention will be hereinafter described with reference to a recycled product, which was processed by the present production process: namely; a bumper, which was made from a polyurethane resin by R-RIM molding, was processed by the present production process.

Specifically, a scrap bumper was prepared, and included a polyurethane resin, and a reinforcing additive. The polyurethane resin was made from the following monomers: polypropylene glycol; diethyltoluenediammine; and 4,4-diphenylmethanediisocyanate. The reinforcing additive was filament-shaped whiskers made from potassium titanate.

Square-shaped test pieces of the identical composition were prepared in the following manner: the monomers and the reinforcing additive were mixed. The mixture was molded to a plate of about 3 mm thick with an RIM molding machine. The molded plate was roughly pulverized to square-shaped pieces of about 5 mm×5 mm size with a hammer mill. The resulting square-shaped pieces were subjected to the present production process.

First Preferred Embodiment
Article Subjected to Recycling

A polyurethane resin bumper of the aforementioned composition was naturally humidified to have a hygroscopic water content of about 0.8% by weight. Another polyurethane resin bumper of the aforementioned composition was forcibly humidified with water to have a hygroscopic water content of about 5.0% by weight. These two humidified polyurethane resin bumpers were roughly pulverized. For comparison, still another polyurethane resin bumper of the aforementioned composition was forcibly dried to have a hygroscopic water content of substantially 0% by weight with a hot-air drier at 120° C. for 2 hours, and the dried polyurethane resin bumper was roughly pulverized.

Recycling Conditions

A dual-axis extruder having an LED ratio of 30 was employed as a recycling apparatus, and was type "AS-30-20" manufactured by NAKATANI Co., Ltd. The recycling temperature was set at two levels, e.g., 250° C. and 280° C. The roughly pulverized square-shaped pieces were recycled with the extruder whose head was opened, and were resided therein for about 60 seconds.

Recycling Results

When the roughly pulverized square-shaped pieces, which had been subjected to the humidifying treatments, and which had a hygroscopic water content of about 0.8% by weight and 5.0% by weight, respectively, were kneaded and extruded at 250° C. with the extruder, the resulting recycled products could be readily pulverized by rubbing with fingers. Note that the rubbing corresponds to the shearing. Moreover, when the roughly pulverized square-shaped pieces, which had been subjected to the humidifying treatments, and which had a hygroscopic water content of about 0.8% by weight and 5.0% by weight, respectively, were kneaded and extruded at 280° C. with the extruder, the resulting recycled products were turned into a soft aggregate, respectively.

On the other hand, when the comparative roughly pulverized square-shaped pieces, which had been forcibly dried, and which had a hygroscopic water content of substantially 0% by weight, were kneaded and extruded at 250° C. and 280° C. with the extruder, the resulting recycled products were still hard, and remained in the same state as they were before the recycling operation.

According to the outcome, the following are apparent: it is necessary to humidify articles to be recycled to prepare the desired product according to the present invention; and a powder or an aggregate of powder can be produced by varying the recycling temperature.

Second Preferred Embodiment

A naturally-humidified polyurethane resin bumper of the aforementioned composition was roughly pulverized. For comparison, another polyurethane resin bumper of the aforementioned composition was forcibly dried with a hot-air drier at 120° C. for 2 hours, and the dried polyurethane bumper was roughly pulverized. In the Second Preferred Embodiment, a pair of open rollers were disposed immediately below an outlet of the dual-axis extruder which was employed as the recycling apparatus in the First Preferred Embodiment. The roughly pulverized square-shaped pieces, and the comparative roughly pulverized square-shaped pieces were extruded at 250° C., respectively.

When the roughly pulverized square-shaped pieces, prepared from the naturally-humidified polyurethane resin bumper, were subjected to the heat treatment by the dual-axis extruder and to the shearing force of the open rollers, they could be readily pulverized. On the other hand, when the comparative roughly pulverized square-shaped pieces, prepared from the forcibly-dried polyurethane resin bumper, were subjected to the treatments, they were simply crushed by the open rollers, but were not pulverized. Note that, in the Second Preferred Embodiment, the resulting present cross-linked powder had a particle-diameter distribution ranging from 1 μm to 200 μm, and its average particle diameter was 85 μm.

Thus, it is apparent that a finely-pulverized material can be produced by the present invention.

Third Preferred Embodiment

A naturally-humidified polyurethane resin bumper of the aforementioned composition was roughly pulverized, and was recycled by a microwave oven having a capacity of 500 W. The recycling was carried out for 1 minute at least, and continued for 5 minutes at most. After recycling, the resulting recycled products were rubbed with fingers, and were observed how they transformed. Note that the rubbing corresponds to the shearing.

When the microwave-oven recycling was carried out for 2 minutes or more, a powder was produced. Moreover, when the microwave-oven recycling was carried out for 5 minutes, an aggregate of powder was produced.

According to the result, it is appreciated that, in the present production process, it is unnecessary to simultaneously carry out the heat treatment and the shearing treatment. Moreover, after thermally treating the naturally-humidified large-sized component parts, such as the naturally-humidified bumpers, directly by a microwave oven, or the like, it is possible to finely pulverize them by applying a shearing force.

Fourth Preferred Embodiment

A naturally-humidified polyurethane resin bumper of the aforementioned composition was roughly pulverized, and the roughly pulverized square-shaped pieces were recycled by the dual-axis extruder, which was employed as the recycling apparatus in the First Preferred Embodiment, in a recycling temperature range of from 220 to 300° C. The resultant recycled products were examined for the spin-spin relaxation time $T_2$ with a pulse NMR apparatus to evaluate the molecular mobility of the recycled products. Moreover, the microwave-oven-recycled products of the Third Preferred Embodiment were similarly evaluated. For comparison, the mechanically pulverized square-shaped pieces were likewise evaluated.

Figure 2:
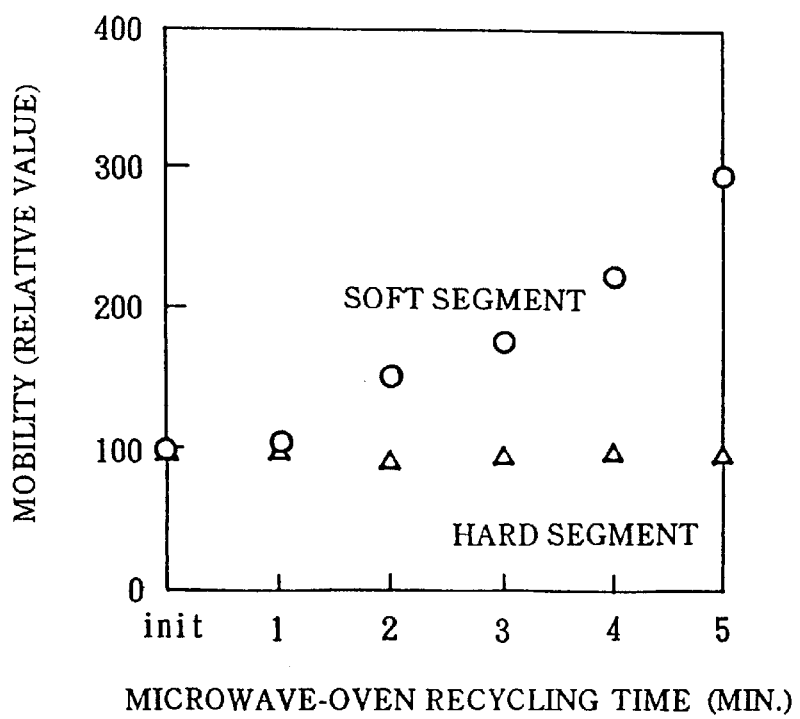
FIG. 2 is a graph for illustrating relationships between microwave-oven processing temperatures and mobilities of hard segments and soft segments of a polyurethane resin.

FIG. 1 illustrates the mobility of the recycled products which were produced by varying the extrusion temperature. FIG. 2 illustrates the mobility of the microwave-oven-recycled products which were produced by varying the recycling time. Note that, in these drawings, the mobility of the recycled products are compared with that of the mechanically pulverized square-shaped pieces taken as 100. According to the drawings, the mobility of the hard segment is constant, but the mobility of the soft segment increases as the recycling temperature enlarges. The fact indicates that the present production process increases the molecular mobility of the soft-segment components resulting from the polyol, etc., and breaks the cross-linking points of the urethane bondings by means of the heat treatment. It is also understood from FIG. 2 that the 3-minute recycling by the microwave oven corresponds to the 240° C. -recycling by the dual-axis extruder.

Thus, in terms of properties, the powder, or the paste (or aggregate) produced by the present production process differs from the simply-mechanically-pulverized pieces.

Fifth Preferred Embodiment
Measurement of Contact Angle

The powder recycled at a recycling temperature of 220° C. in the Fourth Preferred Embodiment was designated at Example No. 5-1. The powder recycled at a recycling temperature of 250° C. in the Fourth Preferred Embodiment was designated at Example No. 5-2. The powder recycled at a recycling temperature of 280° C. in the Fourth Preferred Embodiment was designated at Example No. 5-3. These powders were examined for the contact angle with respect to water. For comparison, an RIM-molded product of the aforementioned composition was pulverized mechanically to a fine polyurethane resin powder having an average particle diameter of 100 $\mu$m. The fine polyurethane resin powder was designated at Comparative Example No. 5, and was similarly examined for the contact angle with respect to water.

Specifically, Example Nos. 5-1, 5-2 and 5-3, and Comparative Example No. 5 were compressed to a tablet with a pressing machine, respectively. Then, a water droplet was dropped onto the tablets, respectively, and the contact angle was measured. The results of the measurement are set forth in Table 1 below. Note that the smaller the contact angle is, the better a substrate (i.e., the tablet) exhibits the wettability with respect to water.

TABLE 1

| Identification | Result of Contact Angle Measurement |
| --- | --- |
| Ex. No. 5-1 | Not measurable, water droplet was soaked immediately. |
| Ex. No. 5-2 | Not measurable, water droplet was soaked immediately. |
| Ex. No. 5-3 | Not measurable, water droplet was soaked immediately. |
| Comp. Ex. No. 5 | 120 degrees |

As can be understood from Table 1, Example Nos. 5-1, 5-3 could not be examined for the contact angle, because the water droplet was soaked immediately into the tablets. Thus, the powder recycled by the present production process is good in terms of water affinity. Whereas, Comparative Example No. 5 exhibited a contact angle of 120 degrees, and had no water affinity.

Sixth Preferred Embodiment

In preferred embodiments hereinafter described, the powder recycled at a recycling temperature of 250° C. in the First Preferred Embodiment was designated at Recycled Product No. 1. The powder recycled at a recycling temperature of 280° C. in the First Preferred Embodiment was designated at Recycled Product No. 2. These powders were subject to the following examinations. For comparison, an RIM-molded product of the aforementioned composition was pulverized mechanically to fine polyurethane resin powders having an average particle diameter of 500 $\mu$m and 100 $\mu$m, respectively. The fine polyurethane resin powders were designated at Comparative Recycled Product Nos. 1 and 2, and were similarly subjected to the following examinations.

In the Sixth Preferred Embodiment, Recycled Product No. 2, and Comparative Recycled Product No. 1 were added to a scrap dash-panel silencer for automobile in an amount of 10% by weight, respectively. The dash-panel silencer was made from EPDM. The mixtures were subjected to kneading and calendering to prepare a sheet, respectively: namely; they were kneaded at 80° C. for 5 minutes with a pressurizing kneader, and were calendered to a sheet of 2.5 mm thick, respectively. The resultant sheets were examined for how the addition of Recycled Product No. 2 and Comparative Recycled Product No. 1 influenced the physical properties of the EPDM forming the scrap dash-panel silencer. The results of the physical property evaluations on the sheets are recited in Table 2 below.

TABLE 2

| Evaluated Physical Property | EPDM | Recycled EPDM with Recycled Product No. 2 added by 10% by weight | Recycled EPDM with Comp. Recycled Product No. 1 added by 10% by weight |
| --- | --- | --- | --- |
| Tensile Strength (kgf/cm$^2$) | 17.4 | 19.2 | 16.8 |
| Elongation Retention (%) | 50 | 45 | 28 |
| Tensile Strength at Elevated Temp. of 80° C. (kgf/cm$^2$) | 2.6 | 3.54 | 1.74 |
| Tear Strength (kgf/cm$^2$) | 10.1 | 11.9 | 9.53 |

It is apparent from Table 2 that the physical properties of the recycled EPDM with Recycled Product No. 2 added by 10% by weight were improved over those of the EPDM free from the addition. However, the recycled EPDM with Comparative Recycled Product No. 1 added by 10% by weight were deteriorated in the strengths as well as the elongation. Therefore, it is verified that the present invention can not only enhance the dispersibility of the recycled hard or semi-hard polyurethane resin powder in a substrate, but also upgrade the physical properties of the resulting recycled products.

Seventh Preferred Embodiment

In the Seventh Preferred Embodiment, an actual bumper made from a polyurethane resin was prepared, and sample bumpers were made from recycled polyurethane resins which were prepared by using Recycled Product No. 2 and Comparative Recycled Product No. 2 as one of the raw materials in an amount of 10% by weight, respectively. The resultant sample bumpers were examined for how the addition of Recycled Product No. 2 and Comparative Recycled Product No. 2 influenced the physical properties of the sample bumpers. Note that the actual bumper herein means the bumper which was employed to produce Recycled Product No. 2, and that the polyurethane resin forming the actual bumper had the aforementioned composition.

Specifically, Recycled Product No. 2, and Comparative Recycled Product No. 2 were added to a raw material (i.e., polypropylene glycol) in an amount of 10% by weight, and were molded to a sample bumper with an RIM molding machine, respectively. The actual bumper, and the resultant sample bumpers were punched out to prepare a test specimen having a predetermined dumbbell shape. The thus prepared dumbbell-shaped test specimens were examined for the physical properties. The results of the examination are summarized in Table 3 below.

TABLE 3

| Evaluated Physical Property | Actual Bumper | Sample Bumper with Recycled Product No. 2 added by 10% by weight | Sample Bumper with Comp. Recycled Product No. 2 added by 10% by weight |
|---|---|---|---|
| Superficial State | Good | Good | Poor |
| Flexural Rigidity (MPa) | 766 | 770 | 663 |
| Tensile Strength (MPa) | 23 | 22 | 12 |
| Elongation (%) | 190 | 185 | 165 |

According to Table 3, the physical properties of the sample bumper in which Recycled Product No. 2 was added by 10% by weight were apparently equivalent to those of the actual bumper free from the addition. Whereas, the sample bumper in which Comparative Recycled Product No. 2 was added by 10% by weight exhibited the deteriorated physical properties, such as the superficial quality, and the mechanical strengths. As a result, the present invention can evidently improve the dispersibility of the recycled hard or semi-hard polyurethane resin powder in a substrate, and can simultaneously upgrade the physical properties of the resulting recycled products.

Eighth Preferred Embodiment

In the Eighth Preferred Embodiment, an actual hard foam made from a polyurethane resin was prepared, and sample hard foams were made from recycled polyurethane resins which were prepared by using Recycled Product No. 1 and Comparative Recycled Product No. 2 as one of the raw materials in an amount of 10% by weight, respectively. Moreover, Recycled Product No. 1 was roll-milled to have an average particle diameter of 100 μm in advance. The resultant sample hard foams were examined for how the addition of roll-milled Recycled Product No. 1 and Comparative Recycled Product No. 2 influenced the physical properties of the sample hard foams. Note that the actual hard foam was a hard foam which was prepared by foam-molding a polyurethane resin. The polyurethane resin was made from polyftinctional polyol, methylenediisocyanate, and water. The polyurethane resin included the methylenediisocyanate in an amount of 185 parts by weight with respect to 100 parts by weight of the polyfunctional polyol, and the water in an amount of 4.3 parts by weight with respect thereto.

Specifically, roll-milled Recycled Product No. 1, and Comparative Recycled Product No. 2 were added to the polyfunctional polyol (i.e., one of the raw materials of the polyurethane resin) in an amount of 10% by weight, and were foam-molded to a sample hard foam, respectively. The actual hard foam, and the resultant sample hard foams were cut to prepare a test specimen having a predetermined dumbbell shape. The thus prepared dumbbell-shaped test specimens were examined for the physical properties. The results of the examination are set forth in Table 4 below.

TABLE 4

| Evaluated Physical Property | Actual Hard Foam | Sample Hard Foam with Roll-Milled Recycled Product No. 1 added by 10% by weight | Sample Hard Foam with Comp. Recycled Product No. 2 added by 10% by weight |
|---|---|---|---|
| Operability | Good | Good | Poor |
| Compression Strength (MPa) | 259 | 252 | 250 |
| Density (kg/m$^3$) | 35.5 | 35.8 | 35.7 |

It is apparent from Table 4 that the physical properties of the sample hard foam in which roll-milled Recycled Product No. 1 was added by 10% by weight, and those of the sample hard foam in which Comparative Recycled Product No. 2 was added by 10% by weight were equivalent to those of the actual hard foam free from the addition. However, the powder of Comparative Recycled Product No. 2 was likely to blow up in air. Moreover, it takes longer for the powder of Comparative Recycled Product No. 2 to disperse in the polyfunctional polyol (i.e., one of the raw materials of the polyurethane resin). On the other hand, the powder of roll-milled Recycled Product No. 1 was less likely to blow up in air than the powder of Comparative Example No. 2, and was superior to it in terms of dispersibility.

Thus, it is evident that the powder produced by the present invention has physical properties which differ from those of the conventional mechanically pulverized powders, and that it can be used with enhanced operability.

Ninth Preferred Embodiment

In the Ninth Preferred Embodiment, Recycled Product No. 1, Comparative Recycled Product No. 1, and Comparative Recycled Product No. 2 were added to a polypropylene (PP) resin in an amount of 30% by weight, respectively. The mixtures were kneaded and pelletized with a twin-screw extruder, and the resulting pellets were molded, respectively, to a predetermined dumbbell-shaped test specimen with an injection molding machine. The twin-screw extrusion was carried out at a temperature of 200° C., and the injection molding was carried out at a temperature of 190° C. Note that the water of the polyurethane resin in Recycled Product No. 1, Comparative Recycled Product No. 1, and Comparative Recycled Product No. 2 was removed before carrying out the twin-screw extrusion and the injection molding. The resultant dumbbell-shaped test specimens were examined for how the addition of Recycled Product No. 1, Comparative Recycled Product No. 1, and Comparative Recycled Product No. 2 influenced the physical properties of the PP resin. The results of the physical property evaluations on the dumbbell-shaped test specimens are summarized in Table 5 below.

TABLE 5

| Evaluated Physical Property | PP Resin with Recycled Product No. 1 added by 30% by weight | PP Resin with Comp. Recycled Product No. 1 added by 30% by weight | PP Resin with Comp. Recycled Product No. 2 added by 30% by weight |
|---|---|---|---|
| Dispersion State | Good | Poor | Poor |
| Tensile Strength (MPa) | 18.5 | 19.9 | 17.3 |
| Tensile Elongation (%) | 115 | 17 | 4 |

According to Table 5, Recycled Product No. 1 was finely pulverized by a shearing force in the kneading step using the twin-screw extruder, and was uniformly dispersed in the dumbbell-shaped test specimen accordingly. On the contrary, the polyurethane resin powders of Comparative Recycled Product No. 1 and Comparative Recycled Product No. 2 were agglomerated appreciably in the dumbbell-shaped test specimen, because their powder forms were not changed at all even after they were subjected to the twin-screw extrusion and the injection molding.

Concerning the elongation of the dumbbell-shaped test specimen, the dumbbell-shaped test specimen in which Recycled Product No. 1 was added exhibited an elongation which distinctly distinguished over those of the dumbbell-shaped test specimens in which Comparative Recycled Product Nos. 1 and 2 were added. As a result, the present invention can evidently improve the dispersibility of the recycled hard or semi-hard polyurethane resin powder in a substrate (e.g. PP resin), and can simultaneously upgrade the physical properties of the resulting molded products.

Figure 3:
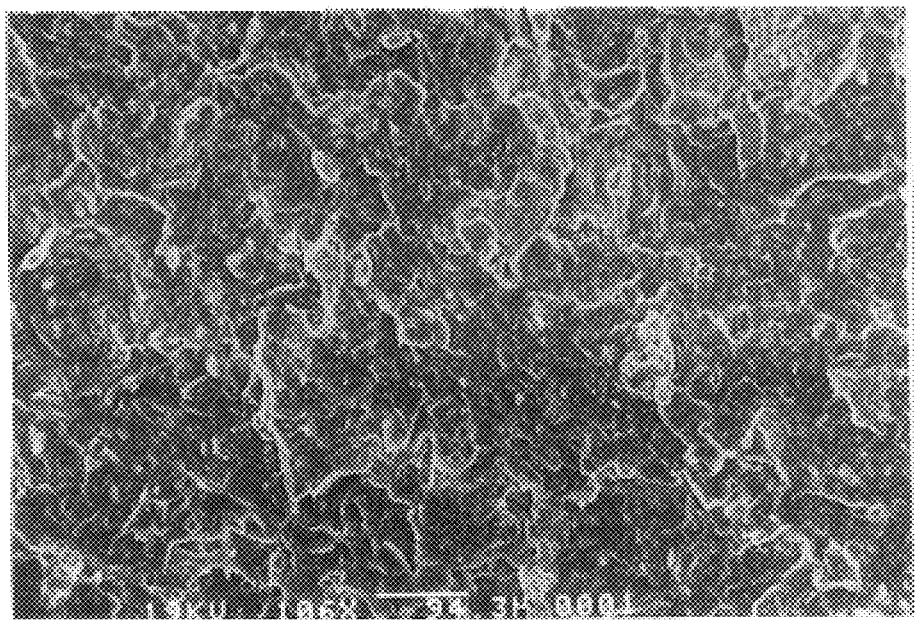
FIG. 3 is a scanning-electron-microscope photograph on Recycled Product No. 1 for showing how the particles of the present cross-linked polyurethane resin powder were dispersed in a polypropylene resin.
Figure 4:
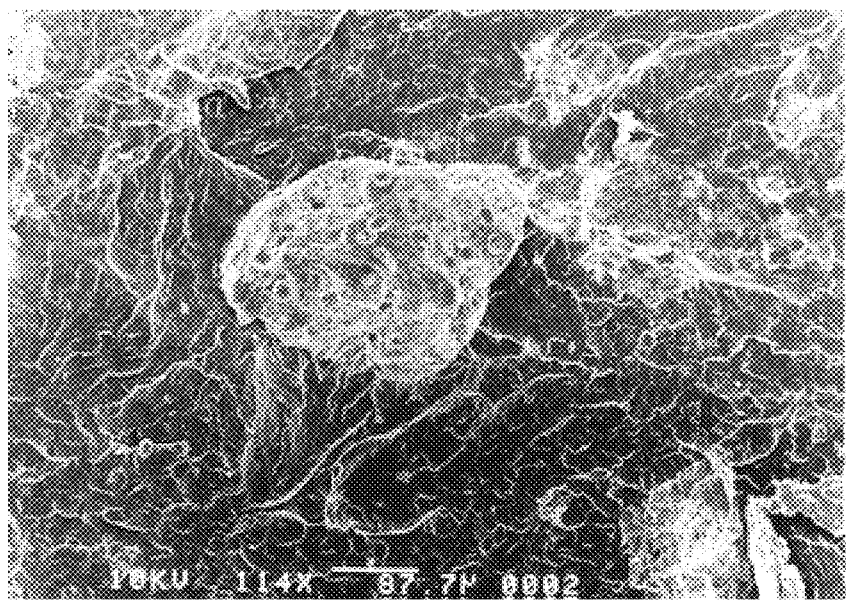
FIG. 4 is a scanning-electron-microscope photograph on Comparative Recycled Product No. 2 for showing how the particles of a mechanically pulverized polyurethane resin powder were dispersed in a polypropylene resin.

Moreover, the dumbbell-shaped test specimen in which Recycled Product No. 1 was added was observed with a scanning electron microscope, and was examined for how the particles of the present cross-linked polyurethane resin powder were dispersed. Likewise, the dumbbell-shaped test specimen in which Comparative Recycled Product No. 2 was added was observed with a scanning electron microscope, and was examined for how the particles of the mechanically pulverized polyurethane resin powder were dispersed. FIGS. 3 and 4 show the photographs thus observed.

As shown in FIG. 3, in the dumbbell-shaped test specimen in which Recycled Product No. 1 was added to the PP resin, the particles of the present cross-linked polyurethane resin powder were more finely pulverized than the time when Recycled Product No. 1 was added thereto, and were well dispersed therein. The boundaries between the PP resin and the polyurethane resin were not clear, and the PP resin and the polyurethane resin were mixed with each other very well.

On the other hand, as shown in FIG. 4, in the dumbbell-shaped test specimen in which Comparative Recycled Product No. 2 was added to the PP resin, the polyurethane resin as pulverized was present therein, and the boundaries between the PP resin and the polyurethane resin were clear.

The above-described results reveal that the present invention can produce powders whose physical properties differ greatly from those of the conventional mechanically pulverized powders, and that it can accordingly modify the hard or semi-hard polyurethane resin.

Tenth Preferred Embodiment

In the Tenth Preferred Embodiment, Recycled Product No. 1, and Comparative Recycled Product No. 1 were added to a thermoplastic polyurethane (TPU) resin in an amount of 30% by weight, respectively. Note that, as the TPU resin, the following 3 specific TPU resins produced by TAKEDA-BADISCHE URETHANE INDUSTRIES were used: "ELASTOLLAN 1190ATR", "ELASTOLLAN ET680A10", and "ELASTOLLAN ET690-10". The mixtures were kneaded and pelletized with a twin-screw extruder, and the resulting pellets were molded, respectively, to a predetermined dumbbell-shaped test specimen with an injection molding machine. The conditions of the twin-screw extrusion, and the conditions of the injection molding were summarized in Table 6 below. Note that the water of the polyurethane resin in Recycled Product No. 1, and Comparative Recycled Product No. 1 was removed by vacuum-drying before carrying out the twin-screw extrusion and the injection molding.

TABLE 6

| Identification of TPU Resin | Identification of Additive | Conditions of Twin-Screw Extrusion | | | Conditions of Injection Molding | |
|---|---|---|---|---|---|---|
| | | Resin Temp. | Revolving Speed | Residing Time | Resin Temp. | Mold Temp. |
| ELASTOLLAN 1190ATR | Recycled Product No. 1 | 200° C. | 400 rpm | Approx. 1 min. | 170° C. | 30° C. |
| ELASTOLLAN 1190ATR | Comp. Recycled Product No. 1 | 200° C. | 400 rpm | Approx. 1 min. | 170° C. | 30° C. |
| ELASTOLLAN ET680A10 | Recycled Product No. 1 | 190° C. | 400 rpm | Approx. 1 min. | 160° C. | 30° C. |
| ELASTOLLAN ET680A10 | Comp. Recycled Product No. 1 | 190° C. | 400 rpm | Approx. 1 min. | 160° C. | 30° C. |
| ELASTOLLAN ET690-10 | Recycled Product No. 1 | 195° C. | 400 rpm | Approx. 1 min. | 175° C. | 40° C. |
| ELASTOLLAN ET690-10 | Comp. Recycled Product No. 1 | 195° C. | 400 rpm | Approx. 1 min. | 175° C. | 40° C. |

The resultant dumbbell-shaped test specimens were examined for how the addition of Recycled Product No. 1, and Comparative Recycled Product No. 1 influenced the physical properties of the TPU resins The results of the physical property evaluations on the dumbbell-shaped test specimens are summarized in

TABLE 7

| Identification of TPU Resin | Identification of Additive | Dispersion State | Tensile Strength (MPa) | Tensile Elongation (%) |
|---|---|---|---|---|
| ELASTOLLAN 1190ATR | Recycled Product No. 1 | Good | 5.2 | 158 |
| ELASTOLLAN 1190ATR | Comp. Recycled Product No. 1 | Poor | 6.7 | 18 |
| ELASTOLLAN ET680A10 | Recycled Product No. 1 | Good | 7.2 | 500 or more |
| ELASTOLLAN ET680A10 | Comp. Recycled Product No. 1 | Poor | 6.9 | 323 |
| ELASTOLLAN ET690-10 | Recycled Product No. 1 | Good | 9.7 | 364 |
| ELASTOLLAN ET690-10 | Comp. Recycled Product No. 1 | Poor | 4.6 | 69 |

According to Table 7, Recycled Product No. 1 was finely pulverized by a shearing force in the kneading step using the twin-screw extruder, and was uniformly dispersed in the dumbbell-shaped test specimens accordingly. On the contrary, the polyurethane resin powder of Comparative Recycled Product No. 1 was agglomerated appreciably in the dumbbell-shaped test specimens, because their powder forms were not changed at all even after carrying out the twin-screw extrusion and the injection molding.

Concerning the elongation of the dumbbell-shaped test specimen, the dumbbell-shaped test specimens in which Recycled Product No. 1 was added exhibited an elongation which distinctly distinguished over those of the dumbbell-shaped test specimens in which Comparative Recycled Product No. 1 was added. As a result, the present invention can evidently improve the dispersibility of the recycled hard or semi-hard polyurethane resin powder in a substrate (e.g. TPU resin), and can simultaneously upgrade the physical properties of the resulting molded products. In other words, the powders produced by the present invention seemingly have physical properties which distinguish over those of the conventional mechanically pulverized powder, and accordingly are modified products of the hard or semi-hard polyurethane resin.

Eleventh Preferred Embodiment

In the Ninth Preferred Embodiment, a bumper made from a polyurethane resin was roughly pulverized to square-shaped pieces. Note that the bumper had been humidified naturally. The square-shaped pieces were added to a polypropylene (PP) resin in an amount of 30% by weight. The mixture was subjected to twin-screw extrusion, thereby simultaneously carrying out the resent production process (i.e., the hydrolyzing step and the shearing or pulverizing step), and the kneading of the mixture.

In the Eleventh Preferred Embodiment, a twin-screw kneader, "NEX-T60" manufactured by KOBE STEEL WORKS Co., Ltd., was employed as the kneader, and kneaded the mixture at 250° C. Subsequently, the kneaded mixture was extended to a strand at 210° C. by a single-screw kneader, and was pelletized thereafter. The resulting pellets were dried, and were thereafter injection-molded at 190° C. to prepare a predetermined dumbbell-shaped test specimen. For comparison, Comparative Recycled Product No. 2 described above was likewise subjected to the aforementioned preparation of the dumbbell-shaped test specimen, and the resultant dumbbell-shaped test specimen was designated at Comparative Example No. 7. The thus prepared dumbbell-shaped test specimens were examined for the physical properties. The results of the physical property evaluations are set forth in Table 8 below.

TABLE 8

| Evaluated Physical Property | 11th Preferred Embodiment | Comparative Example No. 7 |
| --- | --- | --- |
| Dispersion State | Good | Poor |
| Tensile Strength (MPa) | 18.7 | 17.5 |
| Tensile Elongation (%) | 80 | 15 |

It was found that the roughly-pulverized polyurethane-resin square-shaped pieces were finely pulverized by hydrolysis, and at the same time, by a shearing force in the kneading operation, and that they were uniformly dispersed in the dumbbell-shaped test specimen accordingly. Thus, it is appreciated from the Eleventh Preferred Embodiment that the hard or semi-hard polyurethane resin can be decomposed and dispersed in a resinous substrate by one-step processing.

Having now fully described the present invention, it will be apparent to one of ordinary skill in the art that many changes and modifications can be made thereto without departing from the spirit or scope of the present invention as set forth herein including the appended claims.

What is claimed is:

1. A process for producing a cross-linked polyurethane resin powder, comprising the steps of:

hydrolyzing at least one resin selected from the group consisting of a hard polyurethane resin and a semi-hard polyurethane resin, the resin having cross-linked urethane bondings and cross-linked urea bondings therein, in the presence of water and at a temperature of 180° C. or more, the temperature falling in the range of from a hydrolysis temperature of the resin to a liquefying temperature thereof; and shearing the resin by applying a predetermined shearing force to the resin, thereby pulverizing the resin;

the above steps being effective to produce a polyurethane resin powder wherein 20% or more of said cross-linked urethane bondings are broken and from 50 to 75% of said cross-linked urea bondings are unbroken.

2. The process according to claim 1, wherein the resin is pulverized to at least one shape selected from the group consisting of a chip shape and a pellet shape.

3. The process according to claim 2, wherein said pulverizing step is carried out simultaneously with said hydrolyzing step.

4. The process according to claim 2, wherein said pulverizing step is carried out after said hydrolyzing step.

5. The process according to claim 2, wherein said pulverizing step is carried out before said hydrolyzing step.

6. The process according to claim 1, wherein said hydrolyzing step is carried out before said shearing step.

7. The process according to claim 1, wherein said hydrolyzing step and said shearing step are carried out simultaneously.

8. The process according to claim 7, wherein a water content of the resin is 10% by weight or less.

9. The process according to claim 7, wherein the resin is humidified to have a water content of 10% by weight or less before carrying out said hydrolyzing step and said shearing step simultaneously.

10. The process according to claim 1, wherein said shearing step is carried out with an extruder which applies a predetermined shearing force to the resin by means of at least one member selected from the group of a kneader and a rotary blade, thereby extruding the resin.

11. The process according to claim 10, wherein the extruder is provided with heating means for hydrolysis, thereby carrying out said hydrolyzing step and said shearing step simultaneously.

12. The process according to claim 1, wherein the water results from hygyroscopic water contained in the resin in an ordinary state.

13. The process according to claim 1, wherein said hydrolyzing step is carried out at a temperature in a range of from 200 to 310° C.

14. The process according to claim 1, wherein said hydrolyzing step is carried out in a heating bath, which can accommodate a large-sized componenet part made from the resin therein, independently of said shearing step.

15. The process according to claim 14, wherein the large-sized component part is roughly pulverized in advance.

16. The process according to claim 1, wherein said hydrolyzing step is facilitated by at least one additive selected from the group consisting of a compound having an activated hydrogen and an organometallic compound.

17. The process according to claim 11, wherein said shearing step is carried out with at least one shearing apparatus pulverizing the resin by means of a shearing force, and being selected from the group consisting of a pair of flat rolls, an extruder, and a kneader.

18. The process according to claim 1, wherein said shearing step is carried out with at least one shearing apparatus pulverizing the resin by means of an impact force, and being selected from the group consisting of a hammer mill, and a jet mill.

19. The process according to claim 1, wherein said shearing step is carried out with at least one shearing apparatus pulverizing the resin by means of a crushing force, and being selected from the group consisting of a vibration mill, a pair of convexed rolls, and a mortar.

* * * * *

UNITED STATES PATENT AND TRADEMARK OFFICE
CERTIFICATE OF CORRECTION

PATENT NO.: 5,958,988

DATED: September 28, 1999

INVENTORS: MATSUSHITA et al.

It is certified that an error appears in the above-identified patent and that said Letters Patent is hereby corrected as shown below:

Claim 17, column 19, line 5, "claim 11" should read --claim 1--.

Signed and Sealed this

Twenty-ninth Day of August, 2000

Attest:

Attesting Officer

Q. TODD DICKINSON

Director of Patents and Trademarks